(12) United States Patent
Brunswig et al.

(10) Patent No.: US 7,765,494 B2
(45) Date of Patent: Jul. 27, 2010

(54) HARMONIZED THEME DEFINITION LANGUAGE

(75) Inventors: Frank Brunswig, Heidelberg (DE); Thorsten Domsalla, Mannheim (DE)

(73) Assignee: SAP AG, Walldorf (DE)

( * ) Notice: Subject to any disclaimer, the term of this patent is extended or adjusted under 35 U.S.C. 154(b) by 855 days.

(21) Appl. No.: 11/439,209

(22) Filed: May 24, 2006

(65) Prior Publication Data

US 2007/0276875 A1 Nov. 29, 2007

(51) Int. Cl.
G06F 3/00 (2006.01)
G06F 17/30 (2006.01)
(52) U.S. Cl. .................. 715/853; 715/765; 715/835; 707/1
(58) Field of Classification Search ............... 715/764, 715/765, 853, 854, 835; 707/1, 200
See application file for complete search history.

(56) References Cited

U.S. PATENT DOCUMENTS

| 5,684,967 | A  | * | 11/1997 | McKenna et al. | 715/853 |
| 5,987,471 | A  | * | 11/1999 | Bodine et al. | 707/103 R |
| 7,353,464 | B1 | * | 4/2008 | Kundu et al. | 715/853 |
| 7,401,097 | B1 | * | 7/2008 | Baer et al. | 707/104.1 |
| 2004/0090472 | A1 | * | 5/2004 | Risch et al. | 345/853 |
| 2005/0027728 | A1 | * | 2/2005 | O'Neil et al. | 707/100 |
| 2005/0246650 | A1 | * | 11/2005 | Yeung et al. | 715/764 |
| 2006/0122996 | A1 | * | 6/2006 | Bailey | 707/4 |
| 2008/0313282 | A1 | * | 12/2008 | Warila et al. | 709/206 |

* cited by examiner

*Primary Examiner*—X. L Bautista
(74) *Attorney, Agent, or Firm*—Mintz, Levin, Cohn, Ferris, Glovsky & Popeo, P.C.

(57) ABSTRACT

A method for defining a context independent architecture. The method includes positioning identifiers associated with interface elements in a hierarchy, providing a value for each identifier, the value reflecting a position for the identifier in the hierarchy relative to at least one other identifier in the hierarchy, and enabling selection of the interface elements using the identifiers in the hierarchy.

16 Claims, 7 Drawing Sheets

HARMONIZED THEME DEFINITION LANGUAGE

BACKGROUND

1. Field of the Invention

The present invention relates generally to user interfaces and, more particularly, to specification of interface elements.

2. Background and Material Information

To work with a system, users require the ability to control the system and assess its state (e.g., input data and view data output). Typically such control has been accomplished through the use of user interfaces (UI). Numerous variations on UIs exist within the information technology realm. For example, a computer based UI may accept input via devices such as a computer keyboard and a mouse, while providing articulated graphical output on the computer monitor. Web-based user interfaces may also accept input and provide output by generating web pages which are transported via the Internet and viewed by the user using a web browser program. Other UIs may include, for example, command line interfaces, touch interfaces, tangible interfaces, and telephone interfaces.

Object-oriented techniques have become a preferred method for UI development primarily because of its wide availability and the reusability of code and objects. An "object" generally means a software bundle of variables (e.g., data) and related methods (e.g., events) that can be used to define the behavior, appearance, and layout of a UI element (e.g., text box, pushbutton, menu, etc.). For example, in object-oriented programming, an instance of an object is a concrete realization of a class that consists of data and the operations associated with that data. Such a class may be, for example, a pushbutton or a textbox for accepting user input. The class may have particular base attributes and behaviors that come predefined within the class and may define how an instance of the class may appear (e.g., borders and colors) and behave (e.g., button press) within a UI. In other words, the presentation layer and definition are intertwined within the object.

Similar tasks may be accomplished in each interface type using a UI that, while utilizing UI elements that are semantically similar, are perceived differently. For example, a pushbutton in an interface developed in Java and executed as a stand-alone application on a Unix platform may have a very different appearance from a pushbutton in a Microsoft Windows application. Further, object events, properties, and string-derived identifiers may differ substantially, both in availability and function, from one variation to the next, based on the software development platform (e.g., Microsoft .NET Framework, Java, and the like), the rendering engine utilized (e.g., Smart Client Windows Renderer, SAP Unified Rendering, etc.), and the platform (e.g., Unix, Windows, Apple, and so forth). Such variation makes it difficult for developers to communicate using standard language and develop versatile, reusable software code for the multitude of devices, rendering engines, and platforms that are constantly being developed (e.g., mobile phones, personal digital assistants, etc.).

Over time, developers have utilized different methods for standardizing semantics while allowing the presentation layer of user interface objects to change. For example, it has become desirable to present a user interface with a visually pleasing "theme" or "skin," and to allow an end user to select what theme or skin is subjectively most pleasing. A theme or skin is generally a preset package containing graphical appearance details (e.g., colors, translucency, fonts, layout, etc.) used to customize the look and feel of an operating system, widget set, application, and window manager, among other things. Therefore, developers of user interfaces have tried to implement techniques enabling some semantic correlation while allowing appearances of objects in the presentation layer to be changed.

These themes may be described insufficiently with meta-data. For example, a cascading style sheet (CSS) may be applied to a defined interface at runtime for application of a theme or skin, particularly within a Web Interface. CSS is designed primarily to enable the separation of interface/document content (written in HTML or a similar language) from document presentation (written in CSS). While this separation can provide more flexibility and control in the specification of presentational characteristics, and also allow the same markup page to be presented in different styles for different rendering methods, CSS presents some problems. CSS are generally developed in tandem with the user interface to which it applies. In other words, at runtime, the user interface must know where to locate the CSS and will be expecting particular presentation layer definitions to be present within the CSS. Further, the semantics used within the CSS and the user interface must be identical or the application will generally fail to apply the CSS. The definition of the UI is, therefore, intertwined with its presentation layer.

CSS further lacks the ability to specify behaviors for particular interface objects within a user interface, however, some rendering engines have been developed to allow for behaviors along with presentation layers to be defined using meta-data. These applications also present problems in that object behavior is typically hard-coded within the interface and still requires accurate semantics for presentation layer changes at runtime.

In the view of the foregoing, there is a need for systems and methods that allow developers to separate the definition of a UI from the presentation of a UI such that presentation of UI objects depends on context of usage alone. Further, there is a need for systems and methods to free developers of semantics while defining UIs to be used across a wide array of platforms, rendering engines, and themes (i.e., context) without compromising flexibility of design.

The disclosed systems and methods are directed to overcoming one or more of the problems set forth above.

SUMMARY OF THE INVENTION

Consistent with embodiments of the invention, a method for defining a context independent architecture is provided. The method includes the steps of positioning identifiers associated with interface elements in a hierarchy, providing a value for each identifier, the value reflecting a position for the identifier in the hierarchy relative to at least one other identifier in the hierarchy, and enabling selection of the interface elements using the identifiers in the hierarchy.

In another embodiment, a method for using a context independent interface element hierarchy is provided. The method includes the step of determining an element identifier identifying a position within the hierarchy associated with an interface element and including at least one position identifier, wherein at least one position within the hierarchy is associated with a position identifier indicating a position relative to a parent position. The method further includes the step of specifying the element identifier within an interface definition.

In yet another embodiment, a computer-readable medium including instructions for performing a method for utilizing a context independent interface element hierarchy is provided. The method includes the steps of creating a hierarchy having a plurality of positions and positioning a plurality of identifiers within the hierarchy, each identifier associated with a value and an interface element, wherein the value indicates a position relative to at least one other value. The method further includes the step of providing an interface for requesting at least one of the plurality of identifiers.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Methods and systems consistent with the present disclosure may provide a "Harmonized Theme Definition Language" (HTDL). HTDL may be an organized hierarchical architecture for specifying interface elements for use within a user interface definition independently of a presentation context (e.g., theme and rendering engine) Further, HTDL may eliminate the need for design and runtime semantic representations for interface elements. Identifiers may be positioned within a hierarchy such that each available user interface element may be associated with an identifier and a value indicating the element's relative position within the hierarchy. A unique identifier (UID) may be used to specify a series of values and/or identifiers for accessing an interface element. The UID may be a concatenation of identifiers and/or values indicating the parent child relationship of an interface element relative to a base position within the hierarchy. A dataset containing data values assigned to property and object parameters based on possible states of an interface element may define the behavior of the user interface element and may be edited by modifying the dataset. Each class may then be referenced and instantiated by a rendering engine using its UID and state dependent parameter data set.

Figure 1:
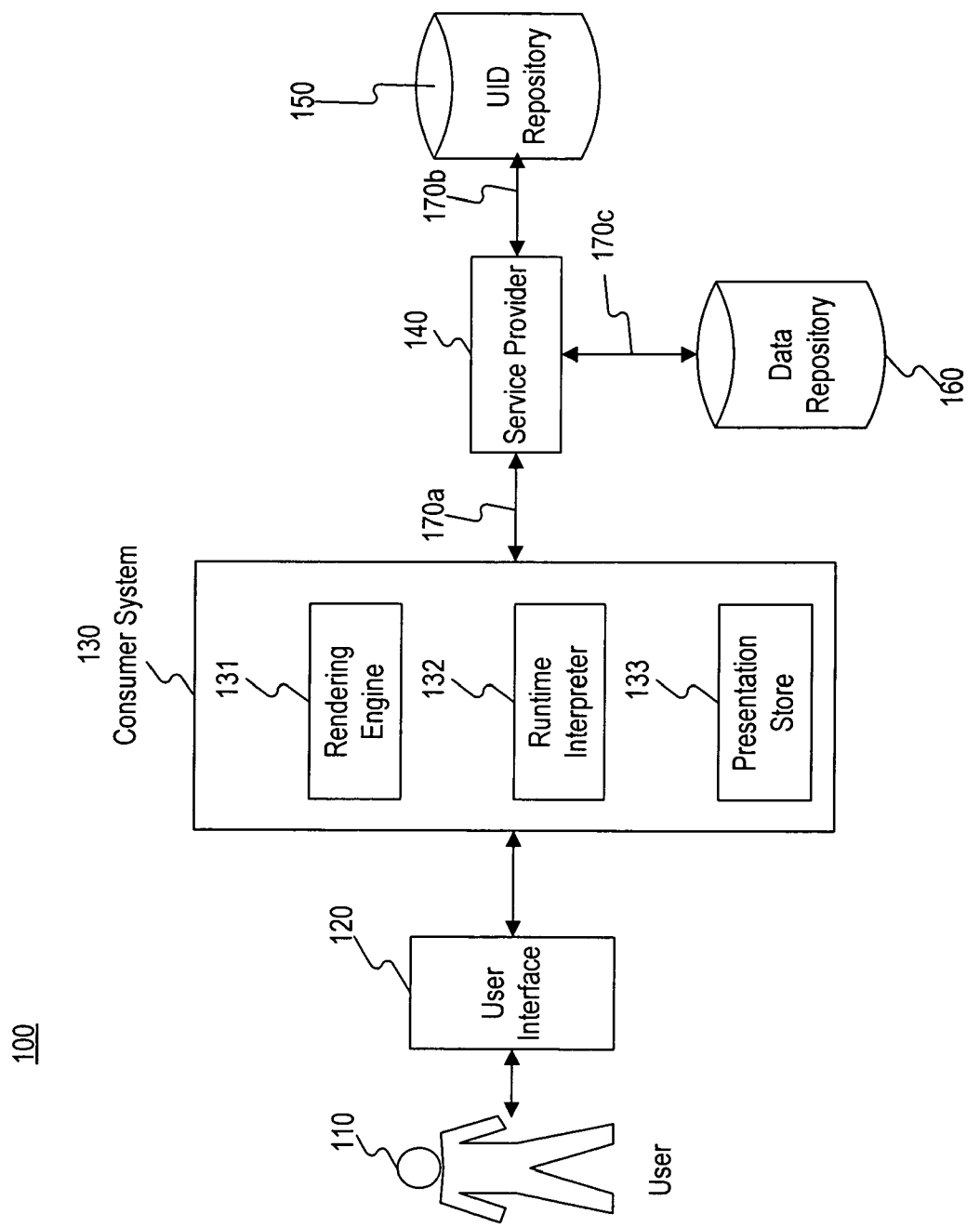
FIG. 1 is a block diagram of an exemplary system environment consistent with the present invention.

Systems and methods consistent with the present invention may be implemented by devices including, for example, computers, cellular phones, personal digital assistants (PDA), hardware keypads, and any other suitable device. FIG. 1 illustrates a block diagram of one exemplary system 100 environment capable of implementing the disclosed embodiments. System 100 may include a consumer system 130, a user interface 120, an service provider 140, and a UID repository 150. Consumer system 130 may include a rendering engine 131, a runtime interpreter 132, and a presentation store 133, and may provide user interface 120 with interface elements. Further, consumer system 130 may also be able to communicate with service provider 140. Rendering engine 131 may render graphical representations of interface elements, among other things. Runtime interpreter 132 may parse code instructions associated with operations, functions, events, and so on, for performing computer based calculations associated with an application at runtime, among other things. Presentation store 133 may store images, sounds, color palettes, and so forth that define a theme for a particular user interface, among other things.

System 100 may also include network connections 170a-170c, which may include, alone or in any suitable combination, a telephony-based network, a local area network (LAN), a wide area network (WAN), a dedicated intranet, wireless LAN, the Internet, a wireless network, a bus, or any other communication mechanisms. Further, any suitable combination of wired and/or wireless components and systems may be used to provide network connections 170a-170c. Moreover, network connections 170a-170c may be embodied using bidirectional, unidirectional, or direct communication links. Further, network connections 170a-170c may implement protocols, such as transmission control protocol/internet protocol (TCP/IP), hyper text transfer protocol (HTTP), file transfer protocol (FTP), simple object access protocol (SOAP), common object request broker architecture (CORBA), remote procedure call (RPC), and the like.

In one embodiment consistent with aspects of the present invention, system 100 may be implemented as part of an enterprise services framework (ESF). An ESF allows service entities (e.g., Web services, software applications, software components, software modules, etc.) to be aggregated to form composite business-level applications. Alternatively, consumer system 130 may be implemented as a client, and service provider 140 may be implemented as a server in a client-server architectural environment.

User 110 may be any entity, for example, user 110 may be a developer who develops a component of system 100, a designer who designs user interfaces and themes for presentations, or an end user of an application. User interface 120 may provide content, such as visual displays, to user 110 to allow interaction and design of a user interface with service provider 140. Moreover, user interface 120 may include a browser configured on consumer system 130 for interacting with applications, such as service provider 140. For example, the browser of user interface 120 may connect, at runtime, to rendering engine 131, runtime interpreter 132, and presentation store 133 through network connections 170a-c to view and interact with content from service provider 140. Alternatively, user interface 120 may exist on the same device as rendering engine 131.

Presentation store 133 may store presentation and theme resources including, for example, images, sounds, and textures for use while rendering user interface 120 in a particular presentation context. Resources for multiple contexts may be stored within presentation store 133, or alternatively, multiple presentation stores may each store resources for a single context. Presentation store 133 may also store information related to behavioral aspects of a user interface object, including, for example, animations and effects.

Rendering engine 131 may receive UIDs and state information for a requested user interface design, such as UIDs associated with a sales tool application interface, from user interface 120, service manager 140, or any other suitable provider of UIDs. User interface 120 may send information related to user actions (e.g., state changes, events, etc.) at user interface 120 to consumer system 130. Consumer system 130 may then parse the information and allocate instructions to rendering engine 131, runtime interpreter 132, and/or presentation store 133. For example, a user clicking a pushbutton within user interface 120 may cause consumer system 130 to allocate instructions to rendering engine 131 to request appearance information for an enabled, pressed pushbutton from presentation store 133. Rendering engine 131 may interpret the UIDs, and render the interface elements according to the presentation context, for display to user 110. For example, elements associated with UIDs defining a sales tool application user interface may be rendered using a Smart Client for Windows rendering engine and applying the Tradeshow theme presentation. Rendering in this fashion may yield a user interface with characteristics particular to the combination of renderer and theme (i.e., presentation context).

At design time, user 110 may request and receive a graphical presentation of available interface elements displayed in a hierarchy or tree view via a design tool configured to integrate with UID repository 150 and a development environment. The design tool may display commonly used semantic representations of interface elements. Other views may also be possible, for example, a series of dropdown boxes may display available interface elements. The developer may select one or more existing interface elements to design a user interface. Further, user 110 may select an interface element and modify the parameters within its associated dataset in order to achieve a modified behavior or appearance for one or more concrete, state dependent definitions. Modification of such parameters will be discussed in greater detail with reference to FIGS. 3A-B.

UID repository 150 may store and organize the hierarchical organization as well as the association of interface elements to particular identifiers within the hierarchy. UID repository 150 may also store and organize parameter datasets associated with each user interface element state, among other things. Parameter datasets may contain multiple object and property parameters defining state-dependent definitions of an interface element. For example, a pushbutton user interface element may be associated with a dataset defining its color, text, and tooltip, among other things, when enabled and unpressed. While each interface element may be associated with a dataset consisting of parameters and data values defining element behavior, the context and presentation of the user interface element may still be determined by rendering engine 131 and presentation store 133. UID repository 150 may be a database, a flat file, or any other suitable storage mechanism.

Data repository 160 may store data associated with applications as well as information associated with user interface construction. For example, data repository 160 may store multiple UIDs and relationships defining a user interface, such as a sales tool interface or a contact management interface. Further, data repository 160 may also store the data associated with the sales tool application. In one embodiment, data repository 160 may also perform functions associated with presentation store 133.

Figure 2:
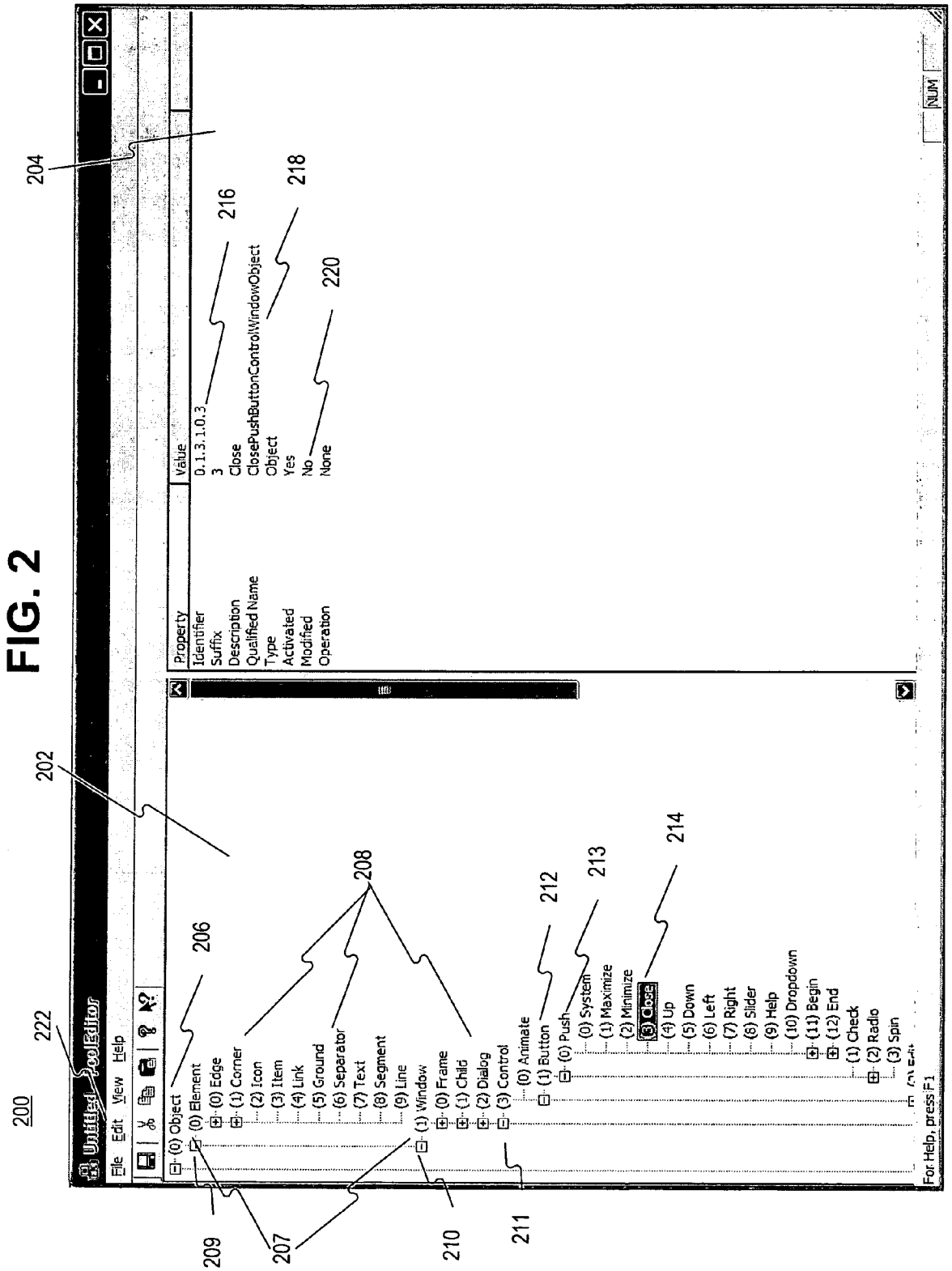
FIG. 2 is an exemplary visual representation of an interface element hierarchy consistent with an embodiment of the invention.

FIG. 2 is an exemplary visual representation of an interface element hierarchy consistent with one embodiment of the invention. To facilitate a discussion of the disclosed embodiments, the hierarchical organization will be discussed using a visual frame of reference similar to hierarchy screen 200. It is important to note that a visual representation is not required for purposes of implementing embodiments consistent with the disclosure. Further, many other visual representations of the hierarchy may be possible without deviating from the scope of this disclosure.

Hierarchy screen 200 may contain a visual representation of a hierarchy or tree architecture in hierarchy pane 202 and detail information in detail pane 204. Identifiers may be positioned in a parent/child type arrangement within hierarchy pane 202 and may be accessed by expanding or contracting the tree within hierarchy pane 202. For example, object element 206 may represent the anchor point or base element/identifier value for the hierarchy. Therefore, object element 206 may be assigned an identifier value of "0." Alternatively, object element 206 may also be assigned any desired identifier value.

Object element 206 may be of class "object," although another semantic representation may be used. It should be noted that semantic representations used throughout this discussion are for frame of reference only and any semantic representation for an object or element may be used. For example, a common pushbutton may be referenced by the semantic representations "button," "JButton," "clicker," or any other suitable title. Additional parent elements may also be present (not shown) and assigned identifier values relative to object element 206. For example, a second element at the same level within the hierarchy may be assigned the identifier value "1," relative to object element's 206 identifier value.

Other elements within the hierarchy may be children of object element 206 or other parent elements (not shown). Each child element may have additional children of its own and assigned identifiers relative to the parent element (i.e., same level of the hierarchy). For example, object element 206 may have child elements 207 and child elements 207 may have grandchild elements 208, each assigned an identifier value relative to the respective parent element. Organization in this fashion may continue throughout the hierarchy until all elements are defined and positioned within the hierarchy.

Determining a series of identifier values for comprising a UID associated with an interface element within the hierarchy, in this case the "ClosePushButtonControlWindow" element, will now be described with reference to FIG. 2. It is important to recognize that although particular organization, hierarchy, and semantics are described with respect to this example, any ordering, hierarchy, and semantics may be used without departing from the scope of this disclosure. In other words, elements need not be ordered or named in the fashion described herein. Further, the graphical representation of the hierarchy and selection of an element is intended to facilitate an understanding of the disclosed methods and not a concrete implementation of the disclosure. Object element 206 may be assigned identifier value "0." Child elements of object element 206 may be assigned identifier values starting at "0" and continuing in order through exhaustion of child elements of the parent. For example, child element 209 may be assigned identifier value "0" which may indicate its position as the first element relative to the parent element (i.e., object element 206). Window element 210 may be assigned the identifier value "1," indicating its position as the second element relative to the parent element (i.e., window 210). Window element 210 may be a child of object element of 206, therefore the series of identifier values creating the path to window element 210 (i.e., the UID) may be represented by "0.1."

Continuing through the hierarchy toward the "ClosePushButtonControlWindow" element, the children of window element 210 may include "frame," "dialog," "child," and "control," among other things. While any other suitable ordering may be used, for purposes of the present example it is assumed that control element 211 is assigned an identifier value "3" relative to the parent window element 210 (i.e., "frame," "dialog," "child," etc.). Therefore to reference the UID for control element 211, the series of identifier values designating the path may be represented by "0.1.3."

Children of control element 211 may include elements "animate," "button," "check," "radio," and the like. Again, each element may be assigned an identifier value relative to the parent control element 211. For example, animate may be assigned an identifier value of "0" indicating it is in the first position relative to the parent element. Button element 212 may be assigned an identifier value of "1" indicating it is in the second position relative to the parent, or may be assigned any other identifier value. In the present example, to reference the UID for button element 212, the series of identifier values designating the path may be represented by "0.1.3.1."

Following steps similar to those above it can be seen that "push" may be a type or child of a button as are radio, spin, etc. Push element 213 may have an identifier value of "0" relative to the parent or may be assigned to any other identifier value. Therefore, the series of identifier values indicating a path to a push type button object may be "0.1.3.1.0." Further, close element 214 may be a child of push element 213 and may have an identifier value of 3 (or other assigned identifier value), indicating its position relative to the parent push element 213. Other types of push elements 213 may include sliders, minimizers, maximizers, and so on. Assuming an identifier value for close element 214 to be "3" as shown, a series of identifier values, or a UID, defining the full path to a ClosePushButtonControlWindow element within the hierarchy may be represented by "0.1.3.1.0.3." In other words, to utilize an instance of a ClosePushButtonControlWindow element, a user interface may specify a UID of 0.1.3.1.0.3.

Detail pane 204 may display details of a selected element within the hierarchy. Detail pane may contain element UID display 216, qualified semantic display 218, and element status 220, among other things. For example, using the ClosePushButtonControlWindow element from above, element UID may be displayed as 0.1.3.1.0.3 by element UID display 216 while the qualified name "ClosePushButtonControlWindow" may be displayed by qualified semantic display 218. If the dataset defining parameters of the element, has not been modified, element status 220 may indicate no modifications have been made. Alternatively, where the element has been modified, status display 218 may indicate such.

It may be possible to access a parameter dataset modification interface from hierarchy pane 202 or detail pane 204. For example, a user may single click, double click, right click, or take other suitable action with respect to an element within hierarchy pane 202 or detail pane 204 to gain access to a dataset containing element parameters. Upon taking such action, the user may be enabled to modify parameters within a dataset describing the element. The parameter dataset describing an element is discussed in greater detail below with reference to FIGS. 3A-B.

Figure 3A:
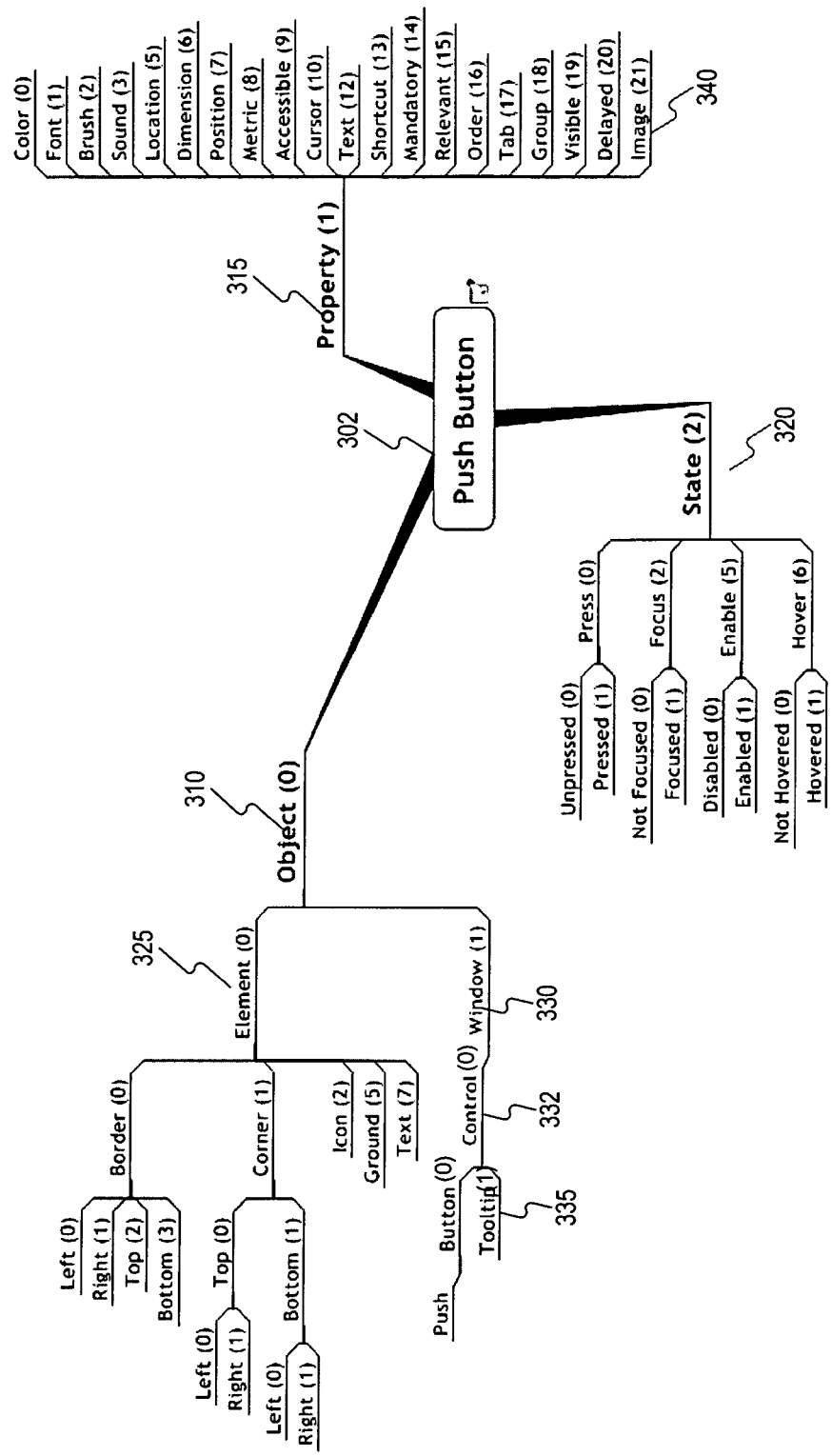
FIG. 3A is one exemplary representation of an interface for viewing and editing a representation of interface elements and associated dataset parameters.

FIG. 3A is an exemplary representation of an interface for viewing and editing a representation of interface elements and associated dataset parameters. Once again, it is important to note that a visual representation is provided to assist in comprehension of the disclosed embodiments and is not intended to be a mandatory implementation. Any order and/or set of identifiers may be used to reference particular parameters within the dataset without departing from the scope of the present disclosure. Each element within the hierarchy may be associated with a dataset containing property and object parameter collections for each possible interface element state (i.e., an element definition). An element may have a single state, multiple possible states, or any combination of states including, for example, enabled/disabled, hovered/not hovered, focused/unfocused, and so forth. The dataset and associated definitions for an element may be state oriented. In other words, for each possible element state, a definition of the element exists consisting of object and property parameters. In one example, push button 302 identified by UID 0.1.3.1.0 may have an object parameter collection 310 and a property parameter collection 315 for each state within state parameter collection 320. The pushbutton object may be enabled and unpressed, enabled and pressed, disabled, or any other suitable combination. One state for a pushbutton object may, therefore, be "enabled." Further, a pushbutton may also be "pressed" while enabled, and where a pushbutton is disabled, other state based parameters may not apply. For example, a disabled pushbutton may not be pressed or unpressed, it may simply remain unpressed and accordingly, may have only a definition for an unpressed state.

For each possible state, each of the object and property parameter collections may have multiple parameters associated with it. For example, a definition may exist for an enabled and also for a pressed pushbutton wherein each may have a property parameter collection 315 containing parameters specified for color, font, and sound, among other things. The appropriate rendering may, therefore, be determined by identifying the definition for an enabled pushbutton and the definition for a pressed pushbutton and rendering according to the context.

Each parameter within a property collection may define a particular aspect of an interface element and how a rendering engine may render the element in view of the applicable presentation and state information. For example, property parameter collection may contain a parameter identified by the parameter-identifier "1.19." The parameter identified by the parameter-identifier 1.19 may be a "visible" parameter, which may be used to indicate whether the associated element should be made visible within user interface 120. A user may remove parameter 1.19 indicating the element should be invisible, or, in another embodiment, a value may be specified as 1 or any other suitable value for indicating the element should be visible. Depending on the presentation context for the element, an invisible button may be rendered completely invisible, as a dashed line, or any other suitable method for rendering an invisible element.

Each parameter collection may have multiple branches or paths that may be traversed to locate and modify a particular parameter. For example, object parameter collection 310 may have an element branch 325 and a window branch 330, each of which may have additional branches (e.g., control, text, ground, icon, etc.). These branches may be identified in a similar fashion to the paths associated with a user interface object as discussed with reference to FIG. 2. For example, tooltip parameter 335 may be referenced by a series of identifiers indicating its position in the dataset, starting with object parameter collection 310 (identifier of "0"), to window branch 330 (identifier of "1") to control branch 332 (identifier of "0"), to tooltip 335 (identifier of "1"). Separating each identifier with a dot yields a parameter identifier of "0.1.0.1." In other words, parameter identifier 0.1.0.1 for a push button element may reference the data value associated with tooltip parameter 335. As another example, image parameter 340, a parameter in property parameter collection 315, may be referenced by the series "1.21." Other parameters within each collection may be referenced in a similar fashion.

Each branch may terminate at a parameter having an associated data value that may be modified. For example, following window path 330 out to tooltip parameter 335, the associated data value may be a string containing the text "click here to activate process." This may be the text to be displayed by user interface 120 at runtime when a user hovers a cursor over the element within the display. Where a user desires to change a parameter, the data value associated with the parameter identified by the series of identifiers may be modified. For example, tooltip parameter 335, also identified by 0.1.0.1, may be modified to instead contain the text "press button to activate." Alternatively, presentation store 133 or other resource may contain values that may be associated with a parameter existing within the set of parameters for an element definition.

Figure 3B:
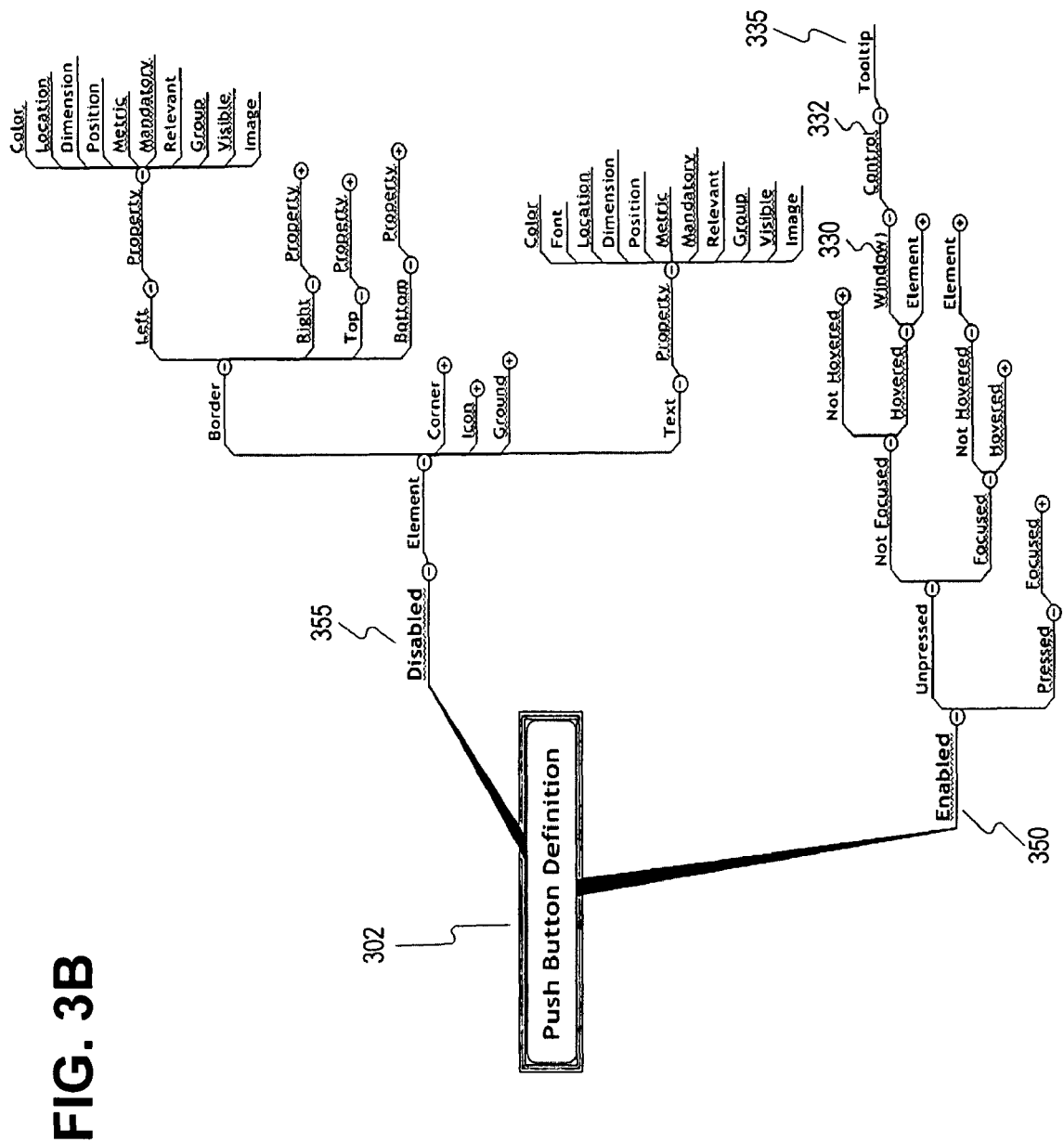
FIG. 3B is an exemplary visual representation of a definition for one possible state of a pushbutton object.

FIG. 3B is an exemplary visual representation of a definition for one possible state of a pushbutton object. Each user interface element may have a definition for each possible state of the element. Further, each object parameter may be associated with a distinct set of property parameters. A complete definition of an interface element may therefore consist of a collection of definition dependent identifiers (DDI). For example, a definition for an enabled, unpressed, hovered, pushbutton may consist of a collection of DDIs, one for each state, object and property specified.

A DDI may include the concatenation of the state parameter identifier, the object parameter identifier, and the property parameter identifier (e.g., stateID_objectID_propertyID). In an embodiment using an ordered concatenation, it may be possible to use a shorthand representation for each of the state identifier, object identifier, and property identifier. In other words, where the order is always stateID_objectID_propertyID, a parameter collection identifier (e.g., state=2, object=0, property=1) may not be necessary to indicate which parameter collection is being referenced. Alternatively, the parameter identifiers may be ordered in any order and using any suitable method and/or may contain multiple state, object, and property identifiers (e.g., state_state_property_object_object).

Each DDI may represent the rendering parameters for a particular combination of state, object, and property and may be used by a rendering engine, in combination with other DDIs, to determine how a particular element should be rendered in view of the context and state information provided by user interface 120. In one embodiment, pushbutton 302 may have possible states enabled 350 and disabled 355, with each state having object and property parameter collections for defining the element. One DDI for an enabled pushbutton object may include a tooltip and, therefore, determination of a DDI will be discussed in reference to the object parameter "tooltip."

The enabled state 350 for pushbutton 302 may be represented as "2.5.1," or, using shorthand representation, "5.1." This may indicate the pushbutton state (i.e., 2) for the enable parameter (i.e., 5) should be set to enabled (i.e., 1). As noted, each state may have an associated object and property collection. Therefore, working through the object parameter collection, the parameter identifier for tooltip 335 may be 0.1.0.1. Concatenating the object portion of the DDI yields "2.5.1_ 0.1.0.1." A property associated with a tooltip for pushbutton 302 may be the location of the tooltip, or property parameter identifier "1.5." Therefore, concatenating the property parameter yields a complete DDI of "2.5.1_0.1.0.1_1.5." In an embodiment using ordered concatenation, the same DDI may be represented using shorthand notation as "5.1_1.0.1_5," because it may be unnecessary to indicate which parameter collection is being referenced. Multiple DDIs may be assembled into a collection using the techniques described above to form a complete definition of an interface element.

Figure 4:
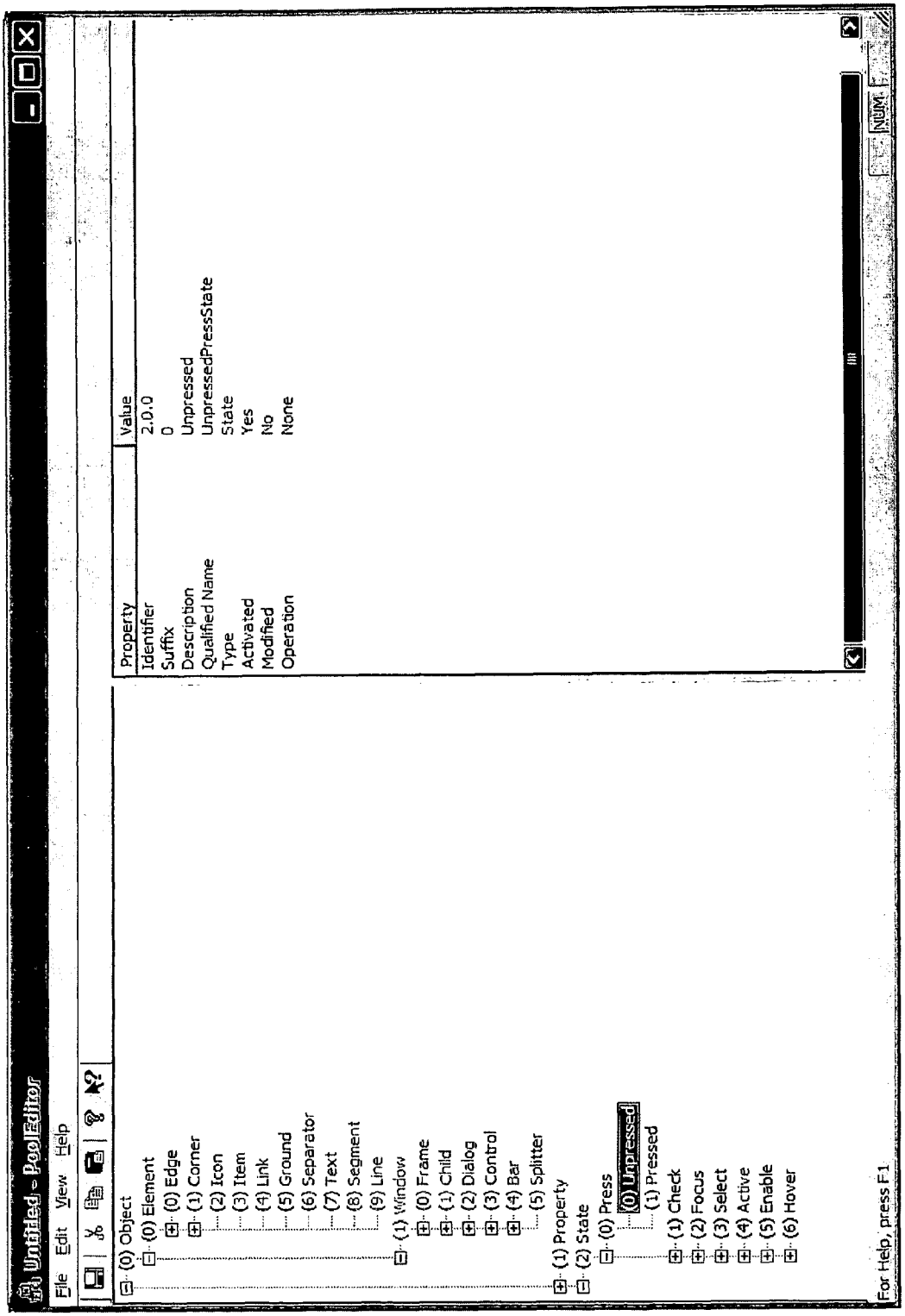
FIG. 4 is another exemplary representation of a graphical interface, for viewing and editing a representation of an interface element and its associated dataset parameters.

FIG. 4 is another exemplary representation of a graphical interface, for viewing and editing a representation of an interface element and its associated dataset parameters. FIG. 4 is provided as an alternative to FIG. 3A to facilitate comprehension of the disclosed embodiments. Parameter identifiers may be referenced using techniques similar to those used in reference to FIG. 3A.

Figure 5:
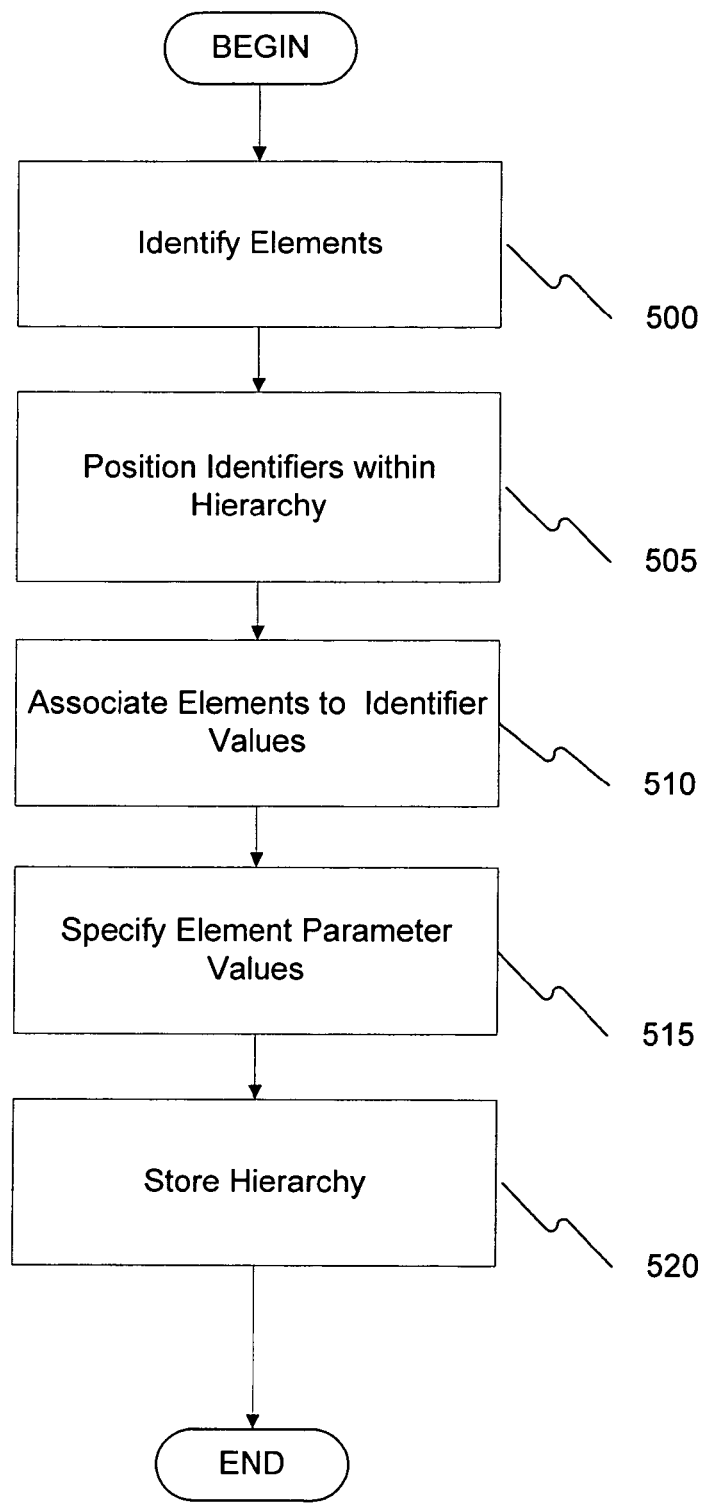
FIG. 5 is a flowchart of an exemplary method for creating an organized hierarchy of interface elements.

FIG. 5 is a flowchart of an exemplary method for creating an organized hierarchy of interface elements. Elements to be included within the hierarchy may first be identified by an entity or group of entities (e.g., a consortium of software developers) (step 500). Identification of elements may include, for example, listing interface elements, determining default behavior for the elements, and determining how such elements are related. Further actions taken during identification of elements may include providing a semantic name for the element and identifying a storage location, among other things. For example, returning to the "ClosePushButtonControlWindow" example discussed above, a user may define an interface element specifying a name as "ClosePushButtonControlWindow," and determining the element should default to visible status with a tooltip value of "click to close." One of skill in the art will recognize that numerous suitable configurations for defining interface elements may be utilized without departing from the scope of the present disclosure.

Once the interface elements have been identified, identifiers may be positioned within the hierarchy and assigned identifier values (step 505). The hierarchy may be arranged using any order or methodology desired. In one embodiment, a series of parent child relationships may be created throughout the hierarchy, with the goal of grouping similar interface elements as children of a related parent element. For example, a control element may have many children including, for example, frames, animations, text boxes, and tab controls, among other things. A button element may also be the child of a control element and as such, may be arranged as a child of a control element. Further, there may be numerous types of buttons (e.g., push, check, radio, spin, etc.) and therefore, these types of buttons may all be arranged as children of a button element. This positioning may be carried out through the entire hierarchy such that the hierarchy is arranged in a logical layout. Alternatively, there may be no particular logic to the arrangement of the hierarchy.

Once identifiers have been positioned within the hierarchy and identifier values assigned, identifier values may be associated to each interface element to indicate the interface element's position within the hierarchy (step 510). As described above, elements may be assigned identifier values to facilitate identification using a series of identifier values to define a path to the element within the hierarchy. Each identifier value may indicate a position relative to the parent. The parent may also be assigned an identifier value indicating the parent's position relative to the parent's parent element (or the base element). Using the example discussed above with reference to FIG. 2, a window element may be a child of an object element. The window element may have an identifier value of "1" indicating its position relative to the parent object 206. Parent/child relationships may be carried out to arrive at a close button object with an identifier value of "3" indicating its position relative to the parent. Identifier values may start and end with any number, provided the elements are assigned identifier values relative to the parent element.

Following identification of elements to be included within the hierarchy, parameters within an associated dataset for each possible element state may be specified (step 515). Specifying data values for parameters associated with an element may include, for example, setting the visibility, setting the tooltip text, and setting the border type. Many other parameters may be set, or alternatively, interface elements may have few, if any, parameters set initially. Where few or no parameters are set for interface elements, a user of the architecture may be able to set additional parameters as desired.

Once data values have been specified for the parameters, the hierarchy may be stored at a suitable location (step 520). The hierarchy and datasets related to interface elements may resemble a relational database table structure. Alternatively, a flat file structure may be created using, for example, XML to represent the hierarchy and datasets. Storage may then be accomplished within UID repository 150, data store 160, or other suitable location (e.g., flat file to a hard disk). Further, the hierarchy may be stored on paper as a visual representation for reference, similar to a database diagram. The hierarchy and datasets may then be accessed at design time, runtime, or other suitable time to determine parameters associated with interface elements.

Figure 6:
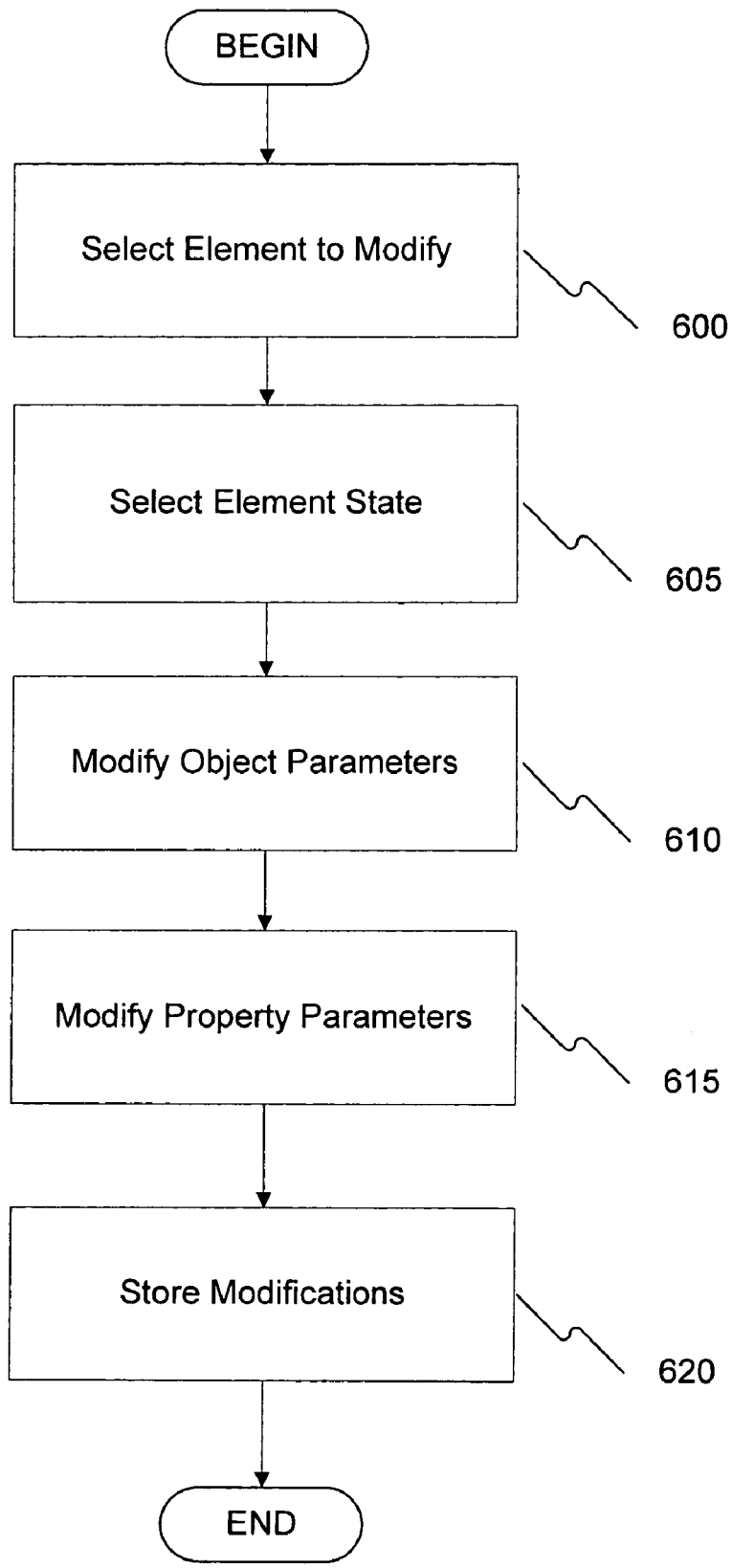
FIG. 6 is a flowchart depicting an exemplary method for modifying parameter data values within a dataset related to an interface element.

FIG. 6 is a flowchart depicting an exemplary method for modifying parameters within a dataset related to an interface element. Each user interface element within the hierarchy may have a dataset containing parameters and associated data values, which define object and property information for each possible element state. Where a particular user desires customized functionality, or where no default data values are specified, the user may edit the parameters and/or associated data values, to obtain desired rendering characteristics for an element. A user may first select an interface element to modify (step 600). The user may make a selection from a graphical interface similar to those depicted by FIGS. 3A and 4, or may select an element by locating an entry for the desired element in a relational database, flat file, or any other suitable location. Further, the user may reference the desired user interface element by its semantic representation (e.g., ClosePushButtonControlWindow), or may reference the desired element by its UID (e.g., 0.1.3.1.0.3). For example, a user may use a command line tool and specify 0.1.3.1.0.3 as the control to modify, thereby indicating the ClosePushButtonControlWindow element (based on the example organization described with reference to FIG. 2) should be modified. The user may then proceed to modify parameters and associated data values for the element.

A user may next select one possible state for the chosen element (step 605). Element state may include, for example, pressed, unpressed, hovered, not hovered, enabled, and disabled, among other things. A user may select an interface element state by specifying the parameter identifier for the state to be modified. For example, a user may wish customize the ClosePushButtonControlWindow element when such a control is set as disabled. The user may indicate parameter identifier 2.5.0 indicating a desire to modify object and property parameters for a ClosePushButtonControlWindow in a disabled state.

The user may next modify object based parameters for the selected element state (step 610). Object based parameters may include information related to, for example, borders, icons, corners, and tooltips, among other things. For example, a user wishing to customize the icon displayed on an disabled ClosePushButtonControlWindow element within a user interface may select the user interface element by specifying its UID, double-clicking in a graphical interface, or other suitable method. The user may then specify an icon to display by setting the data value associated with parameter identifier 0.0.2 to a valid pointer to the icon (e.g., a location within presentation store 133). Other object based parameters may be set in a similar fashion, or by using other methods.

After a user has set object based parameters, the user may wish to set property based parameters for the user interface element (step 615). Property based parameters may include, for example, font, sound, position, and text, among other things. A user may set property based parameters by selecting the parameter using the parameter identifier for the parameter. A user desiring to customize the text for a ClosePushButtonControlWindow element may modify the data value associated with parameter 1.12. For example, the data value for parameter 1.12 may specify that "X" should be displayed as the text in a ClosePushButtonControlWindow element. A user may, therefore, specify text such as "close" for parameter 1.12, which may cause the text "close" to be displayed in the ClosePushButtonControlWindow element. In another example, the user may specify the position of the ClosePushButtonControlWindow element within the user interface by setting a value for parameter 1.7. Numerous other property based parameters may be customized by a user prior to use in a user interface.

Following modification of parameters, a user may store modified user interface element definition(s) (step 620). Definitions may be stored to UID repository 150, data store 160, or any other suitable location.

Representations of user interfaces, UIDs, and parameter identifiers discussed throughout this disclosure may be represented and/or stored using numerous methods. For example, eXtensible Markup Language (XML) may be used to create and store UIDs defining a user interface. XML may provide a text-based means to describe and apply a tree-based structure to information. Alternatively, any other suitable means for representing and storing information may be utilized.

Further, the steps related to exemplary methods may be described in a particular order, however, the sequences of steps may be carried out in a different order than that described without departing from the scope of the present disclosure.

Other embodiments of the invention will be apparent to those skilled in the art from consideration of the specification and practice of the invention disclosed herein. Therefore, the specification and examples should be considered as exemplary only, with a true scope of the invention being indicated by the following claims.

What is claimed is:
1. A method comprising:
   positioning identifiers associated with interface elements in a hierarchy;
   providing a value for each identifier, the value reflecting a position for the identifier in the hierarchy relative to at least one other identifier in the hierarchy; and
   enabling selection of the interface elements using the identifiers in the hierarchy, each of the interface elements associated with an object parameter, a property parameter, and a state parameter, wherein each interface element is identified by the identifier, each identifier is configured as a definition dependent identifier configured to include a first portion representative of the object parameter, a second portion representative of the property parameter, and a third portion representative of the state parameter, the first, second, and third portions concatenated to define the interface element.

2. The method of claim 1, wherein positioning identifiers further includes defining at least one parent identifier and at least one child identifier.

3. The method of claim 2, wherein the value provided for the at least one child identifier reflects a position relative to the at least one parent identifier.

4. The method of claim 2, wherein at least one parent identifier is also a child identifier.

5. The method of claim 1, wherein the interface elements include controls, windows, frames, and objects.

6. The method of claim 5, further comprising: determining attributes for each interface element within the interface elements; and associating data values with parameters related to the at least one definition within the dataset.

7. The method of claim 1, further comprising: specifying at least one dataset, each of the at least one datasets including at least one definition of an interface element within the interface elements; and associating each interface element within the interface elements with at least one of the at least one datasets.

8. The method of claim 7, wherein each definition within the at least one definition of an interface element is associated with an element state.

9. The method of claim 8, wherein the interface element state includes at least one of enabled, disabled, hovered, not hovered, focused, not focused, pressed, and unpressed.

10. The method of claim 7, wherein each of the at least one definitions includes a definition dependent identifier.

11. The method of claim 10, wherein the definition dependent identifier includes a state parameter identifier, an object parameter identifier, and a property parameter identifier.

12. The method of claim 11, further including modifying at least one of the object parameter and the property parameter based on the state parameter.

13. A computer-readable storage medium including instructions which when executed on a processor provide a process comprising:

positioning identifiers associated with interface elements in a hierarchy;

providing a value for each identifier, the value reflecting a position for the identifier in the hierarchy relative to at least one other identifier in the hierarchy; and enabling selection of the interface elements using the identifiers in the hierarchy, each of the interface elements associated with an object parameter, a property parameter, and a state parameter, wherein each interface element is identified by the identifier, each identifier is configured as a definition dependent identifier configured to include a first portion representative of the object parameter, a second portion representative of the property parameter, and a third portion representative of the state parameter, the first, second, and third portions concatenated to define the interface element.

14. The computer-readable medium of claim 13, wherein the interface element includes at least one of a control, a window, a frame, and an object.

15. The computer-readable medium of claim 13, further comprising: storing at least one dataset, each of the at least one datasets including at least one definition of an interface element within the interface elements; and associating each interface element within the interface elements with at least one of the at least one datasets.

16. The computer-readable medium of claim 15, wherein each definition within the at least one definition of an interface element is associated with an interface element state.

* * * * *